Sept. 3, 1940.  C. W. PUNTON  2,213,433
RESPIRATOR FILTER
Filed March 26, 1937  4 Sheets-Sheet 2
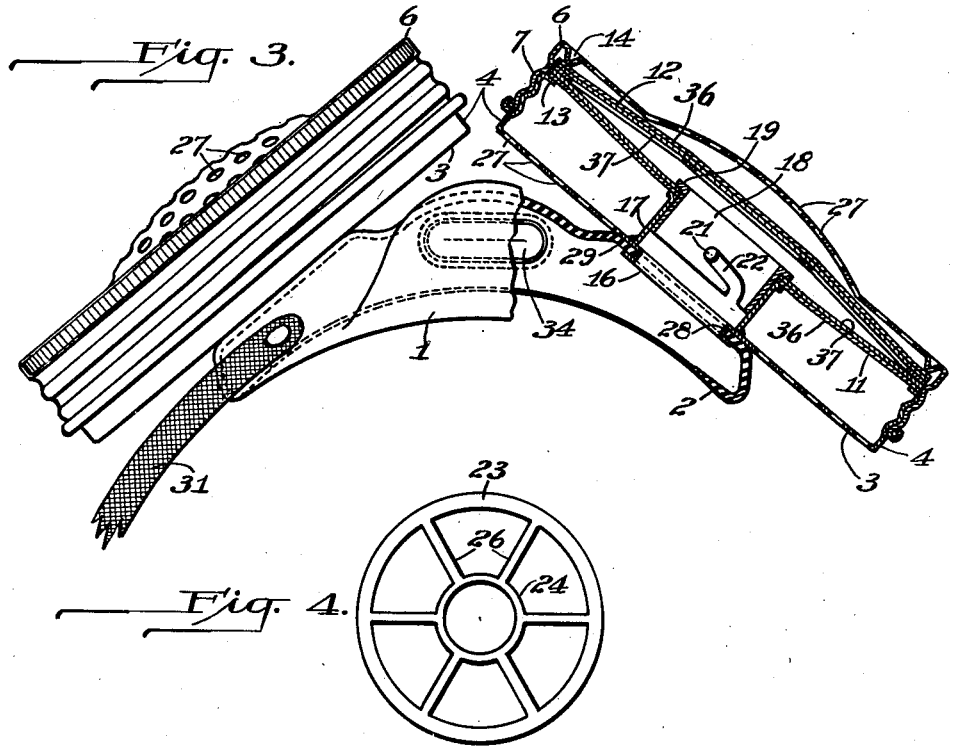
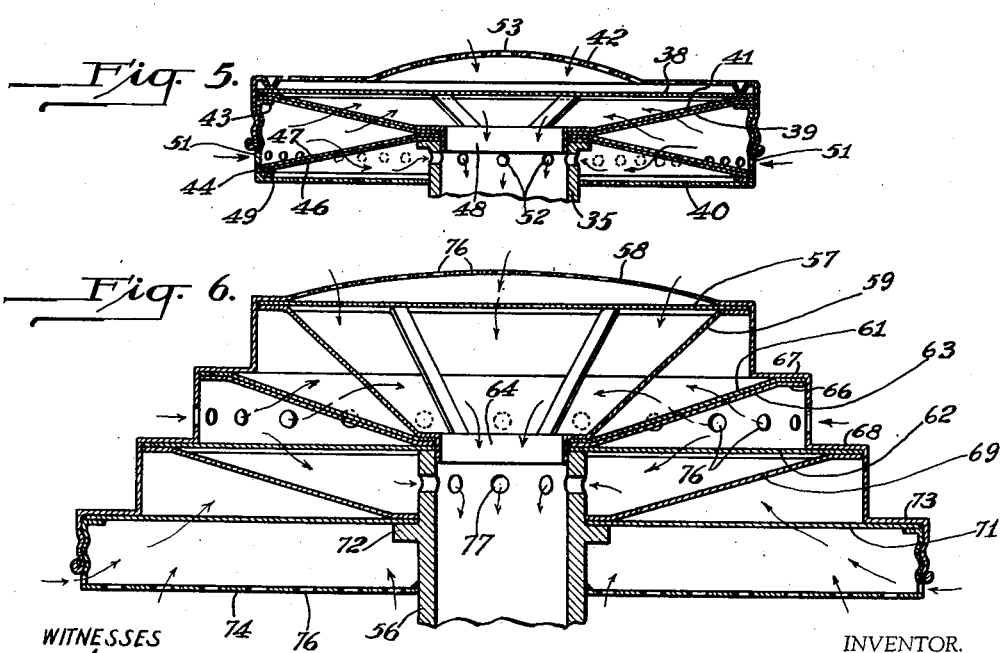
WITNESSES
A B Wallace
V. A. Peckham
INVENTOR.
Charles W. Punton
BY Brown, Critchlow & Flick
his ATTORNEYS.

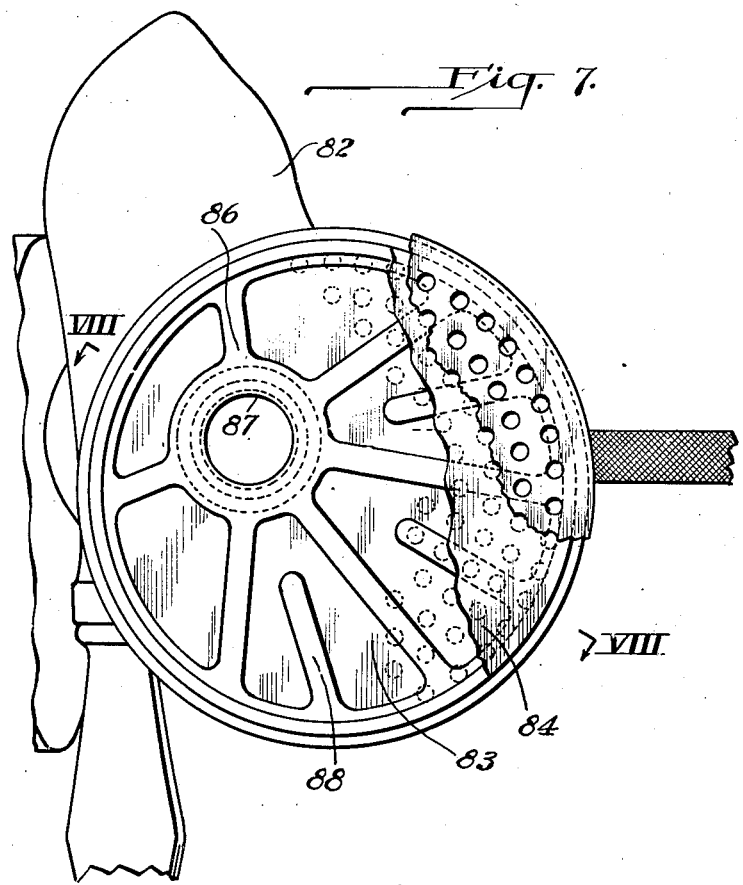
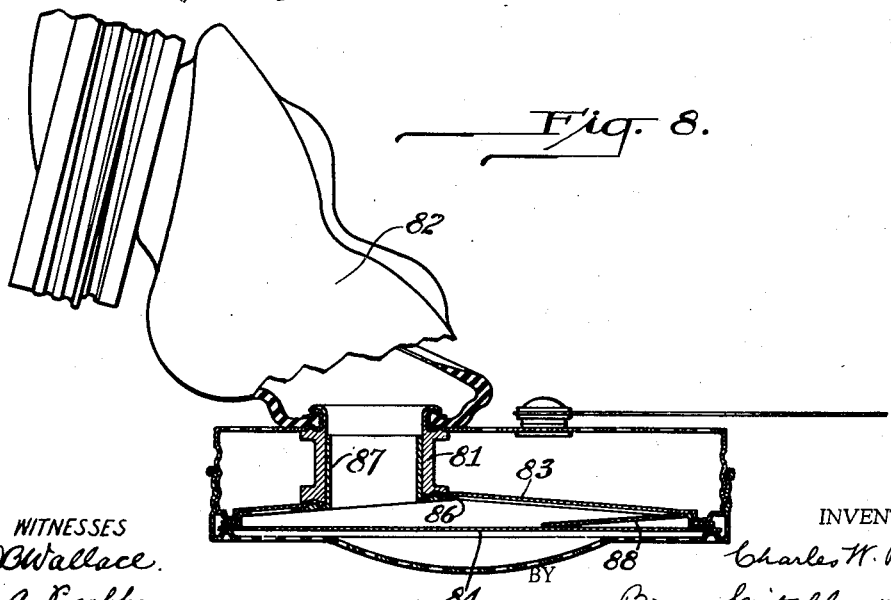

Sept. 3, 1940.   C. W. PUNTON   2,213,433
RESPIRATOR FILTER
Filed March 26, 1937   4 Sheets-Sheet 4

Patented Sept. 3, 1940

2,213,433

UNITED STATES PATENT OFFICE 2,213,433

RESPIRATOR FILTER

Charles W. Punton, Pittsburgh, Pa., assignor to Mine Safety Appliances Company, Pittsburgh, Pa., a corporation of Pennsylvania Application March 26, 1937, Serial No. 133,163

13 Claims. (Cl. 183—71)

This invention relates to respirators, and more particularly to those used for removing solid material, such as dust, smoke, and other solid particles, from air to purify it for breathing.

In my Patent No. 2,019,928, granted November 5, 1935, a respirator designed for this purpose is disclosed, it being light in weight, relatively simple in construction, and compact. It comprises a face-piece adapted to be positioned over the nose and mouth, an outlet valve in the bottom of the face-piece, and a pair of filter units, symmetrically connected one to each side of the face-piece where they overlie the lower part of the wearer's face. Each filter unit comprises a casing having a perforated cover for the ingress of unfiltered air, and contains a sheet-like filter element through which the air must pass and be filtered before it can leave the casing through an outlet port which is connected to the inside of the face-piece. Although this respirator has proved to be very successful, it has been found desirable, in some cases at least, such as in high altitudes or when the wearer is under great physical strain, to have a greater filtering area than this respirator provides in order to still further decrease breathing resistance which not only reduces the wearer's physical efficiency, but also induces him to work without a respirator with the dangers attendant thereon.

It is among the objects of this invention to provide a compact and light-weight respirator which offers unusually low resistance to breathing and in which the filter elements are easily removed and replaced when necessary.

Figure 1:
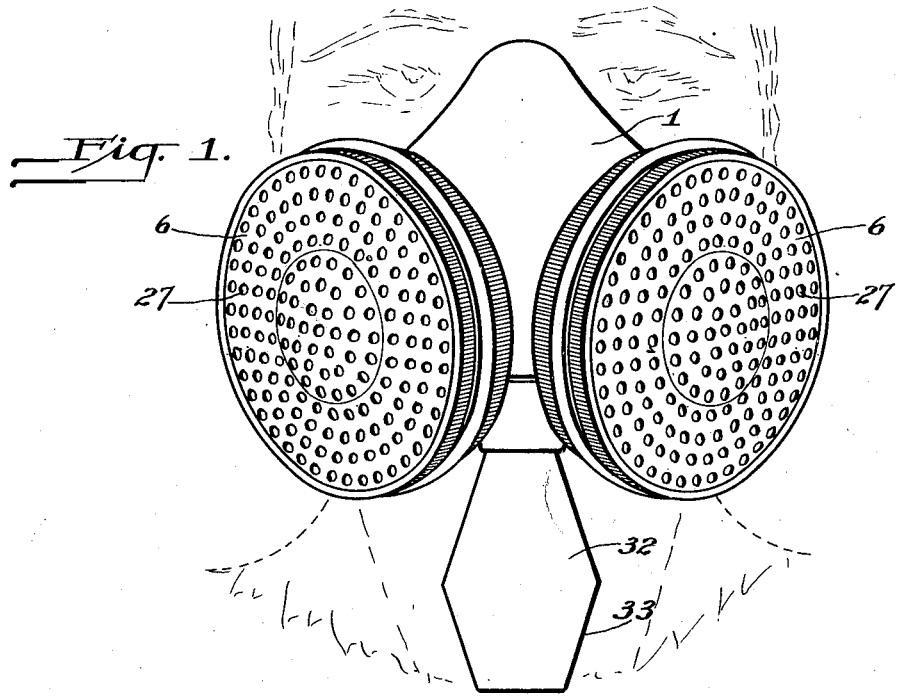
Figure 2:
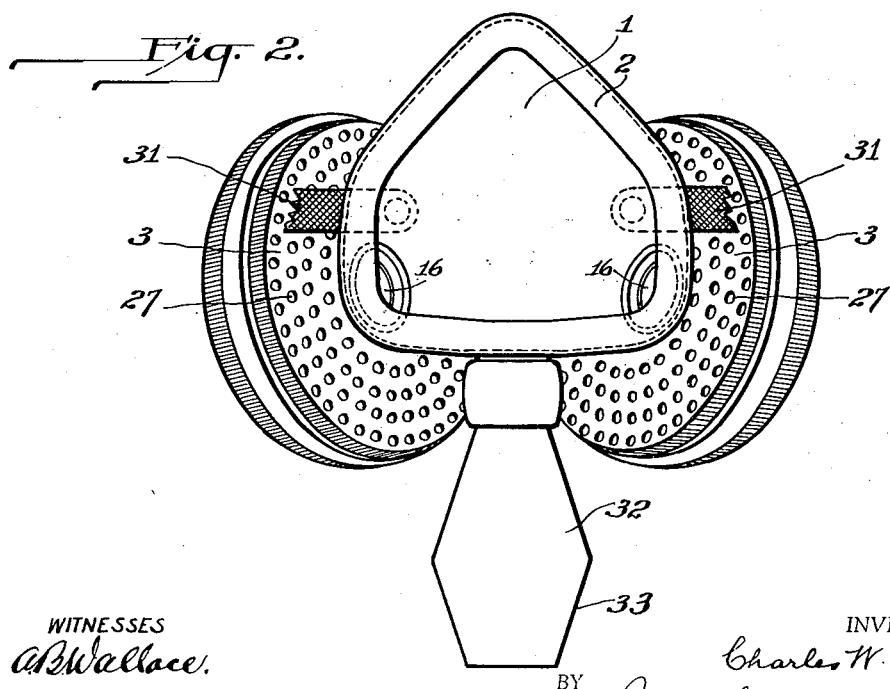
Figure 9:
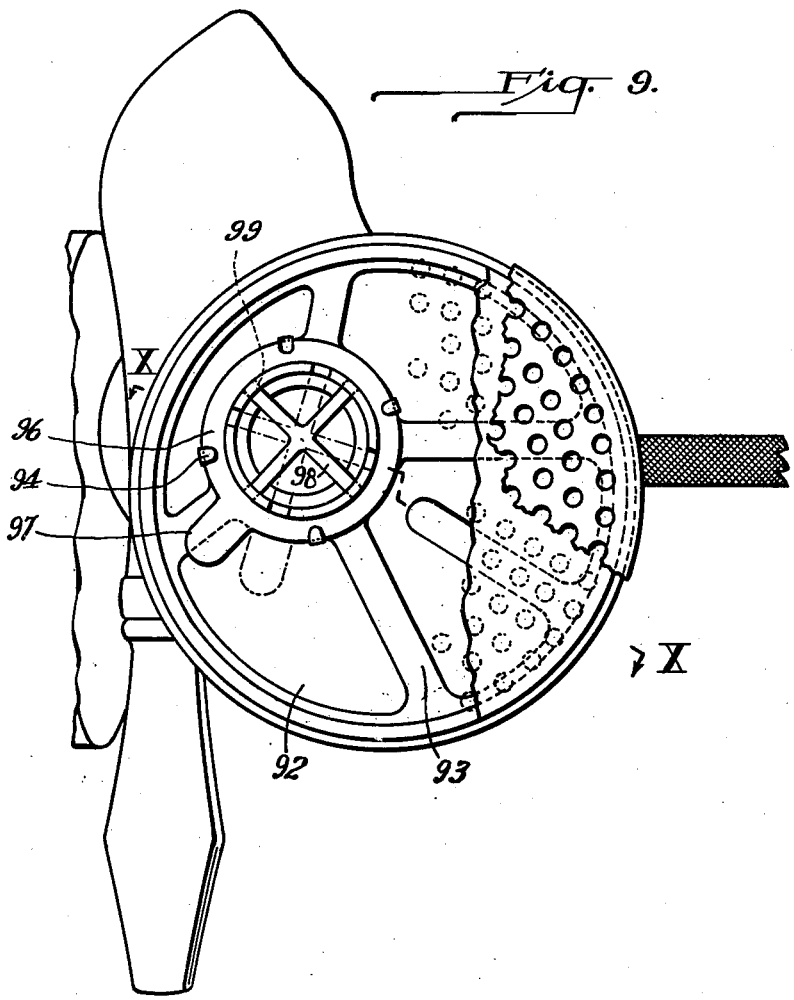
Figure 10:
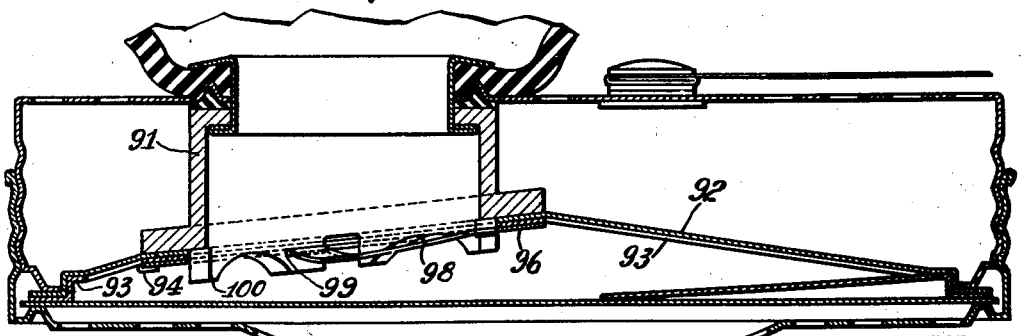

The invention is illustrated in the accompanying drawings in which Fig. 1 is a front view of the respirator; Fig. 2 is a rear view thereof; Fig. 3 is a plan view with half of the respirator shown in horizontal section; Fig. 4 is a reduced plan view of one of the filter-separating elements; Figs. 5 and 6 are sections through two modifications of filter units; Fig. 7 is a perspective view of another embodiment with the filter unit broken away; Fig. 8 is a plan view of the respirator shown in Fig. 7 with one of the filter units in section taken on line VIII—VIII thereof; Fig. 9 is a view similar to Fig. 7 of a still further modification of the invention; and Fig. 10 is an enlarged section of the filter unit taken on line X—X of Fig. 9.

In accordance with this invention, a filter unit is connected to each side of a face-piece that is adapted to be positioned over the nose and mouth of a wearer. Each filter unit comprises a canister containing at least two filter elements which are spaced apart. The walls of the canister adjacent the filter elements are provided with air openings for ingress of unfiltered air, and the canister is also provided with an outlet port for filtered air communicating with the space between the filter elements and with the inside of the face-piece. Preferably, the latter opening is located in the back of the canister and communicates with the space between the filter elements by means of a tubular member. During inhalation unfiltered air is drawn through at least two walls of the canister, through all of the filter elements, and then into the face-piece by way of the outlet port. Consequently, the filtering area of this respirator is substantially two or more times that of my patented respirator mentioned above, and breathing resistance is lowered accordingly. The filter elements are retained in the canisters in such a manner that they may be readily removed when necessary and replaced by new filter elements.

Referring to the first three figures of the drawings, a face-piece 1, adapted to cover the nose and mouth, is preferably of the general shape known in the art. Suitably it is made of flexible material, advantageously soft rubber, for adapting it closely to the contour of the features of the wearer, so as to prevent leakage of air around the face-piece, thus necessarily causing all of the air inhaled by the wearer to be drawn through the filter units presently to be described. Preferably, the face-piece is provided with an inturned lip 2 which may decrease in thickness toward the edge, thus providing a feather-edge to insure sealing completely around the face-piece. Not only does this inturned lip insure a good seal between the face-piece and the face of the wearer, but it permits that result to be obtained with maximum comfort to the face of the wearer.

Each filter unit includes a cylindrical canister in the form of a casing comprising a back or base 3 and a side wall 4 upstanding therefrom, and a cover 6 removably associated therewith. The cover is, of course, associated with the casing in such manner as to prevent leakage of air between them, and to be readily removable for rapid and easy changing of the filter elements when that is desirable. Various means may be associated with the cover and casing for that purpose, but in the embodiment shown, side walls 4 and cover 6 are provided with cooperating screw threads 7.

It is a feature of this invention that two or more filter elements are mounted in each canister where they are spaced apart; that at least two walls of the canister are provided with openings for the ingress of unfiltered air to both filter elements; and that the canister is also provided with an outlet port which connects the space between the elements with the inside of the face-piece for supplying filtered air to the wearer. Accordingly, in the embodiment shown in Fig. 3 a pair of circular sheet-like filter elements 11 and 12 are supported around their edges between cover 6 and casing wall 4. A particularly advantageous way of supporting the filter elements while positively sealing them against leakage of air around their edges is to turn inwardly the upper edge of casing wall 4 to provide a continuous radial flange 13 on which the edge of filter element 11 rests. Also, cover 6 is provided adjacent its edge with an inwardly projecting annular rib 14 which overlies flange 13. When cover 6 is screwed into place, rib 14 is forced downwardly against the edge of filter element 12, thus clamping and sealing the edges of the filter elements in place.

Each casing is provided with an outlet port 16 in the center of its base, and inner filter element 11 is provided centrally with a similar port in line with the outer port. Means is provided for connecting these two ports together and preventing unfiltered air from passing from behind inner filter 11 directly into the outlet port of the casing. One way of doing this is by a tubular member 17 secured to the base of the casing in sealing engagement therewith around outlet port 16 and extending inwardly toward the port in filter element 11. For sealing filter 11 to the inner end of this tubular member a collar 18 is provided which extends through the filter port and telescopes into the tubular member. The collar has a radial flange 19 that overlies filter 11 around its outlet port for clamping it against the inner end of the tubular member. The clamping action is obtained, and the collar is detachably locked to the tubular member, preferably by a bayonet joint comprising pins 21 projecting radially inwardly from the wall of the tubular member and into inclined recesses 22 in the adjacent portion of the collar. The length of the tubular member is such that its inner end lies in a plane offset inwardly of the plane in which casing flange 13 lies. Consequently, when the central portion of inner filter 11 is clamped against the tubular member by collar 18, the filter becomes concave with its body portion spaced from outer filter element 12.

To increase the air space between the filter elements and to prevent filter 12 from being drawn inwardly against collar 18 during inhalation and substantially shutting off the air supply, a spacing member is disposed between the two filters. As shown in Fig. 4, this member is preferably in the form of a spider, that is, an outer ring 23 connected to an inner ring 24 by integral radial spokes 26. The outer ring is clamped between the edges of the two filter elements, but the inner ring engages only outer filter 12. The width of the spokes and the rings is small enough to prevent the spider from covering up so much of the outer filter as to materially decrease its efficiency. The space between the filters can be increased, as shown in Fig. 3, by offsetting the inner ring of the spider relative to the outer ring so as to make the spider and outer filter concave on the side adjacent the inner filter. In accordance with this invention the cover and the base of the casing are both provided with a plurality of perforations 27 to allow unfiltered air to reach both filter elements.

The face-piece is provided with two such filtering units disposed symmetrically, one on each side of the face-piece, where they overlie the cheeks of the wearer but are low enough to be out of his line of vision, as shown in Fig. 1. Each unit is connected to the face-piece by the wall of outlet port 16 which is in the form of an annular flange 28 extending through an opening in the face-piece with its edge turned outwardly to tightly clamp the face-piece against the back of the canister (Fig. 3). Most suitably the face-piece is molded to provide at this point an offset 29 which has the advantage that it prevents collapsing of the face-piece during the act of inhalation.

The respirator is provided, as usual, with head straps 31 of any desired form for holding it in position on the face of the wearer. It is also provided, at the bottom of the face-piece, with a flutter valve 32 that may take any of the customary forms, that shown being formed of rubber with its walls normally in contact as is necessary in a flutter valve. The upper portions of the walls are connected at their edges, but their lower edges are slitted at 33 to provide exhalation slots. The mouth of the valve is slipped over the exhalation opening of the face-piece, and in order to prevent collapsing of this opening, there is inserted in it a rigid, flattened tubular member 34.

It will be observed from Fig. 1 that the filter units are of such size as to accommodate filter elements of relatively large area. This permits the use of filtering materials which, if of small area, might exhibit rather high breathing resistances, but owing to the great area exposed in this respirator the actual breathing resistance is low. This factor is further enhanced by the use of two filter units, each of which contains two filter elements. For instance, using canisters 4 inches in diameter, there will be exposed about 40 square inches of filter area, making it possible to use coarse, soft, filter paper as the filtering element. Furthermore, the greater the filter area the longer the life of the filter, because they can be used longer before becoming fouled to such an extent as to necessitate replacement.

While various sheet-like filtering elements may be used, it is preferred to use a porous cellulose material in sheet form and of such porosity as to satisfactorily remove particles of the size encountered in use. That is, for coarse dusts there may be used a cellulosic material sheet whose pores are coarser than those of a paper applied in a respirator for fine particles, such as those of smokes. Must suitably the filter element is formed from cellulose fiber sheet treated to provide pore openings of critical size as described and claimed, for example, in U. S. Patents No. 1,798,164 to Harry A. Kuhn and William A. Boyle, No. 1,814,190 to R. L. Sebastian and L. Finkelstein, and No. 1,818,155 to N. E. Oglesby and R. S. Brown. These filter materials have the advantage that they can be adapted to the removal of even the finest dusts, it being possible by the treatments described in the aforesaid patents to render the pore openings less than one micron in size, while at the same time providing filters that are efficient and of not unduly high breathing resistance.

In some instances it may be desirable to use a plurality of filtering elements. For instance, where relatively heavy and coarse dusts are encountered together with relatively fine dust, as in coal mines, it may be advantageous to use a filter sheet adapted primarily to remove the heavier or coarser dust, followed by one adapted to remove the fine dust. It has been found that for such purposes it is advantageous to form each filter element of a sheet of fibrous material 36, Fig. 3, such as felt, for initially removing the coarse particles. In back of the felt is placed a cellulose fiber filter sheet 37, preferably of the type described hereinabove, for removing the fine dust. The breathing resistance of the felt is low, and its thickness will depend, of course, on its resistance to air flow and the size of the particles to be removed from the air.

The filter units units described provide for very rapid and very easy replacement of the filter elements and they are sealed against dust leakage. The construction described and shown may be made very light, the casing with its cover being made from light gauge metal, and the filter elements contributing substantialy no weight at all, which is a feature of novelty in respirators of this type.

In the filter unit shown in Fig. 5, the filtering area is still further increased by the use of three filter elements. In this embodiment of the invention two of the filter elements are provided with central openings concentric with the inner end of the tubular coupling member 35 extending through the base of the casing 40. The margins of the outer filter 38 and the intermediate filter 39 with the intervening outer ring of a spider-like spacer 41 similar to that shown in Fig. 4 are clamped tightly between cover 42 and annular flange 43 of the casing side wall 44. Spacer 41 is concave and its inner ring presses filter 39 and innermost filter 46, separated by the inner ring of a second spider-like spacer 47, tightly against coupling 35. Spacer 41 is preferably provided with a short tubular extension 48 that telescopes into the coupling to aid in centering the filters. Spacer 47 is convex with its outer ring pressing the margin of filter 46 tightly against a sealing gasket 49 in the base of the canister.

In this particular embodiment of the invention the casing side wall, instead of its base, is provided with air openings 51. There are also a plurality of openings 52 in tubular coupling 35. When the wearer of a respirator utilizing this type of filter unit inhales, air is drawn in through openings 53 in the casing cover, through the outer filter 38 and into the face-piece through the coupling 35. Simultaneously, air is drawn in through side wall openings 51 and some of it passes through intermediate filter 39 and into the open end of the coupling, and the rest of it passes through filter 46 and into the coupling through openings 52. The filtering area of this unit is thus increased by the area of the innermost filter element, and breathing resistance is further decreased accordingly.

In the embodiment shown in Fig. 6 the canister contains four filter elements three of which have central openings concentric with tubular coupling member 56. The outer filter 57 is held tightly against the top of casing cover 58 by the outer ring of a concave spider-like spacer 59 clamped between the cover and filters 61 and 62 which, with an intervening spacer 63, are held in sealing engagement with the end of the coupling by the tubular inner ring 64 of spacer 59. The outer ring 66 of spacer 63 presses the margin of filter 61 firmly against an annular shoulder 67 formed in the cover's side wall. The margin of filter 62 is held against another shoulder 68 in the cover by the outer ring of a third spacer 69 which is concave with its inner ring encircling coupling 56 where it presses encircling filter 71 against an annular collar 72 integral with the coupling. The margin of this fourth filter is clamped between the cover's innermost shoulder 73 and the flanged side wall of the casing 74.

The base of the casing, the top of the cover and the side wall of the cover between filter elements 61 and 62 are provided with openings 76. Unfiltered air drawn into this canister through the openings in the top of the cover passes through the outer filter 57 and directly into the open end of the tubular coupling. Some of the air entering the side wall openings passes through filter 61 and into the open end of the coupling while the rest of it passes through filter 62 and into the coupling through openings 77 in its wall between filters 62 and 71. Air entering the canister through the openings in its base passes through innermost filter 71 and into the coupling through openings 77. It will be obvious that the filtering area of this unit is materially greater than either of the units previously described, and therefore that breathing resistance is materially decreased.

In Figs. 7 and 8 there is shown a filter unit of the general type disclosed in Fig. 3. However, in this embodiment the outlet port in the canister base is disposed off center so that the filter units can be mounted low on the face-piece where they give the wearer a greater range of vision. As shown in Fig. 8, the tubular coupling member 81 which is secured in the canister outlet port and aids in connecting the unit to respirator face-piece 82 has its inner end disposed in a plane inclined inwardly toward the center of the base. The reason for this is that as the coupling is off center its filter-engaging end should conform, to some extent at least, to the inclined area of the inner filter element 83 which is concave to form a space between it and outer filter element 84. The inner filter is held in concave form and sealed against the adjoining end of the coupling by a concave spider-like spacer 86. The inner ring of this spacer is preferably provided with a tubular extension 87 that telescopes snugly into the coupling and thereby correctly positions the filter thereon. To prevent the other filter from collapsing against the inner filter during inhalation, the outer ring of the spacer is provided with a plurality of radial spring fingers 88 that are bent outwardly to support the outer filter element.

In the modification disclosed in Figs. 9 and 10 the canister outlet port is again disposed off center and the flanged filter-receiving inner end of the coupling 91 is disposed in an inclined plane, as clearly shown in Fig. 10. However, in this case the inner filter element 92 is detachably locked to the coupling. Accordingly, the inner ring of the spider-like spacer 93 is provided with integral tabs 94 that are bent outwardly over a flat ring 96 rotatable on the spacer and having a radial actuating lug 97 (Fig. 9). This rotatable ring is provided with spokes 98 the outer ends of which are adapted, when the ring is turned, to enter slots 99 in circumferentially spaced extensions 100 of the coupling. When the spokes are in these slots the spacer clamps and locks the inner filter element against the flanged end of the coupling so that the filter can not fall out if the casing cover is removed. By turning ring 96 in the opposite direction its spokes are withdrawn from slots 99 into the space between extensions 100, as shown in dotted lines in Fig. 9. This unlocks the spacer so that it can be lifted off the coupling to renew the inner filter element. Extensions 100 are preferably notched (Fig. 10) so that they will not interfere with passage of air into the coupling.

According to the provisions of the Patent Statutes, I have explained the principle and construction of my invention and have illustrated and described what I now consider to represent its best embodiment. However, I desire to have it understood that, within the scope of the appended claims, the invention may be practiced otherwise than as specifically illustrated and described.

I claim:

1. An air-filtering unit comprising a canister, two filter elements mounted therein with their peripheral edges sealed together by common sealing means, and perforated means extending across the elements between them for spacing the central body portions of said elements apart, opposite walls of said canister adjacent said elements being provided with openings for ingress of unfiltered air, and said canister having an opening communicating only with the space between said elements for egress of filtered air.

2. An air-filtering unit comprising a canister, two filter elements mounted therein with their peripheral edges sealed together and their central body portions spaced apart, opposite walls of said canister adjacent said elements being provided with openings for ingress of unfiltered air, said canister being provided with an outlet port, the filter element adjacent said port being provided with a port, tubular means connecting said ports for the egress of filtered air, and a spider member disposed between said filter elements for spacing said body portions apart, said spider member having radiating spokes terminating at their outer ends in a ring.

3. An air-filtering unit comprising a casing, a cover removably associated therewith, two filter elements mounted therein, and means disposed between the elements for spacing the central portions of said elements apart, said means being in the form of a ring connected by radiating spokes to a larger ring in another plane, said cover and the base of said casing being foraminous for ingress of unfiltered air, and said casing being provided with an opening communicating with the space between said elements for egress of filtered air.

4. An air-filtering unit comprising a casing, a cover removably associated therewith, two filter elements mounted therein, said cover and the base of said casing being perforated for ingress of unfiltered air, and said base being provided centrally with an outlet opening, the filter element adjacent said base being provided with a central opening in line with said outlet opening, tubular means rigidly connecting said openings, and a spider member disposed between said elements and engaging the one adjacent said cover to space the elements apart.

5. An air-filtering unit comprising a canister, two sheet-like filter elements mounted therein, opposite walls of said canister adjacent said elements being provided with air openings, one of said walls being provided with an outlet port and the filter element adjacent thereto being provided with an opening in line with said port, a tubular member rigidly connected to said canister around said port and projecting inwardly to said filter element opening, a collar projecting through said filter element opening and detachably connected to said tubular member, said collar having a radial flange overlying the adjoining filter element for clamping it against the tubular member, and means disposed between said filter elements for spacing them apart.

6. An air-filtering unit comprising a canister, two sheet-like filter elements mounted therein, opposite walls of said canister adjacent said elements being provided with air openings, one of said walls being provided with an outlet port and the filter element adjacent thereto being provided with an opening in line with said port, a tubular member rigidly connected to said canister around said port and projecting inwardly to said filter element opening, a collar projecting through said filter element opening and detachably connected to said tubular member, said collar having a radial flange overlying the adjoining filter element for clamping it against the tubular member and a spider member disposed between said filter elements for spacing them apart.

7. A casing having a perforated base, a cover removably associated with said casing and having a perforated top, two sheets of filter material disposed with their edges gripped between said casing and cover, said base being provided centrally with an outlet port and the filter element adjacent thereto being provided with a central opening in line with said port, a tubular member rigidly connected to said base around said port and projecting inwardly to said filter element opening with its inner end lying in a plane offset inwardly of the plane of said filter edges, a collar projecting through said filter element opening and into telescoping relation with said tubular member, and means for detachably connecting the collar to the tubular member, said collar having a radial flange overlying the adjoining filter element for clamping it against the inner end of the tubular member.

8. A casing having a perforated base, a cover removably associated with said casing and having a perforated top, two sheets of filter material disposed with their edges gripped between said casing and cover, said base being provided centrally with an outlet port and the filter element adjacent thereto being provided with a central opening in line with said port, a tubular member rigidly connected to said base around said port and projecting inwardly to said filter element opening with its inner end lying in a plane offset inwardly of the plane of said filter edges, a collar projecting through said filter element opening and into telescoping relation with said tubular member, means for detachably connecting the collar to the tubular member, said collar having a radial flange overlying the adjoining filter element for clamping it against the inner end of the tubular member, and a spider member disposed between said filter elements for holding the element adjacent the cover away from the other element.

9. An air-filtering unit comprising a canister having a foraminous top and being provided with an outlet port in its base, a tubular member projecting inwardly from said port and having a perforated wall, a pair of filter elements disposed in sealing engagement with the inner end of said member and provided with openings concentric with the opening therethrough, said filter elements diverging toward the canister side wall, said side wall being provided with openings between said elements, and a filter element disposed between said foraminous top and tubular member and spaced from the latter.

10. An air-filtering unit comprising a canister, two filter elements mounted therein with their edges sealed together and their body portions spaced apart, opposite walls of said canister adjacent said elements being provided with openings for ingress of unfiltered air, said canister being provided with an outlet port, the filter element adjacent said port being provided with a port, tubular means connecting said ports for the egress of filtered air, and means between said filter elements for spacing them apart, said spacing means engaging one of said filter elements and having a laterally projecting portion engaging the other of said elements, said spacing means pressing said ported filter element into sealing engagement with said tubular means.

11. An air-filtering unit comprising a canister, two filter elements mounted therein with their edges sealed together and their body portions spaced apart, opposite walls of said canister adjacent said elements being provided with openings for ingress of unfiltered air, said canister being provided with an outlet port, the filter element adjacent said port being provided with a port, tubular means connecting said ports for the egress of filtered air, and a spider member disposed between said filter elements for spacing them apart, said spider member being disposed against one of said filter elements and having a laterally projecting resilient finger engaging the other of said elements.

12. An air-filtering unit comprising a canister, two filter elements mounted therein with their edges sealed together and their body portions spaced apart, opposite walls of said canister adjacent said elements being provided with openings for ingress of unfiltered air, said canister being provided with an outlet port, the filter element adjacent said port being provided with a port, a tubular member extending from said outlet port to said filter port, a spider member engaging said ported filter element, and means connected to said spider member for locking it to said tubular member.

13. An air-filtering unit comprising a canister, two filter elements mounted therein with their edges sealed together and their body portions spaced apart, opposite walls of said canister adjacent said elements being provided with openings for ingress of unfiltered air, said canister being provided with an outlet port, the filter element adjacent said port being provided with a port, a tubular member extending from said outlet port to said filter port and provided with an extension projecting through the filter port, said extension being provided with a plurality of locking slots, a spider member engaging said ported filter element and provided with an annular portion encircling said extension, and means rotatably mounted on said annular portion adapted to enter said slots for locking the spider member to said tubular member.

CHARLES W. PUNTON.